(12) United States Patent
Burlingame et al.

(10) Patent No.: US 11,549,821 B2
(45) Date of Patent: *Jan. 10, 2023

(54) RUNWAY LANDING ALERT SYSTEM AND METHOD

(71) Applicant: HONEYWELL INTERNATIONAL INC., Morris Plains, NJ (US)

(72) Inventors: Glen Burlingame, Redmond, WA (US); Yasuo Ishihara, Kirkland, WA (US); Steve Johnson, North Bend, WA (US); James Ehlers, Bothell, WA (US); Esko Mannisto, Fall City, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 160 days.

This patent is subject to a terminal disclaimer.

(21) Appl. No.: 16/912,358

(22) Filed: Jun. 25, 2020

(65) Prior Publication Data

US 2020/0326206 A1 Oct. 15, 2020

Related U.S. Application Data

(63) Continuation of application No. 16/014,017, filed on Jun. 21, 2018, now Pat. No. 10,739,161.

(Continued)

(51) Int. Cl.
 G06G 7/70 (2006.01)
 G01C 23/00 (2006.01)
(Continued)

(52) U.S. Cl.
 CPC ........... *G01C 23/005* (2013.01); *B64D 45/00* (2013.01); *B64D 45/08* (2013.01); *G08G 5/0013* (2013.01);
(Continued)

(58) Field of Classification Search
 CPC ...... G01C 23/005; B64D 45/00; B64D 45/08; B64D 2045/008; G08G 5/0013; G08G 5/025
(Continued)

(56) References Cited

U.S. PATENT DOCUMENTS 6,983,206 B2 1/2006 Conner et al.
8,594,916 B2 11/2013 He
(Continued)

FOREIGN PATENT DOCUMENTS

EP 1883057 A2 1/2008
EP 2560152 A1 2/2013

*Primary Examiner* — Mahmoud S Ismail
(74) *Attorney, Agent, or Firm* — Lorenz & Kopf, LLP

(57) ABSTRACT

Methods and apparatus are provided for generating a runway landing alert for an aircraft. The method comprises establishing a Runway Awareness Advisory System (RAAS) envelope for the designated target runway of the aircraft. A track of the aircraft is monitored with reference to a centerline of the target runway. Any deviation by the aircraft from the centerline of the target runway is detected and determined if it is within a margin of error. If the deviation is within the margin of error, an altitude parameter of the RAAS envelope is increased. If the aircraft is determined to still be maneuvering with respect to the centerline of the target runway, the altitude parameter of the RAAS envelope is decreased. Otherwise, an alert is generated if the aircraft is outside of the RAAS envelope.

15 Claims, 7 Drawing Sheets

Related U.S. Application Data

(60) Provisional application No. 62/661,156, filed on Apr. 23, 2018.

(51) Int. Cl.
*B64D 45/00* (2006.01)
*B64D 45/08* (2006.01)
*G08G 5/00* (2006.01)
*G08G 5/02* (2006.01)

(52) U.S. Cl.
CPC ....... *G08G 5/025* (2013.01); *B64D 2045/008* (2013.01)

(58) Field of Classification Search
USPC .......................................... 701/17
See application file for complete search history.

(56) References Cited

U.S. PATENT DOCUMENTS

| | | |
|---|---|---|
| 9,430,948 B2 | 8/2016 | Henderson |
| 2004/0030465 A1* | 2/2004 | Conner ................ G08G 5/0013 701/16 |
| 2015/0307207 A1 | 10/2015 | Meunier |
| 2017/0092140 A1* | 3/2017 | Ishihara ................ G08G 5/0039 |
| 2017/0162066 A1* | 6/2017 | Scacchi ................ G05D 1/0676 |

* cited by examiner

RUNWAY LANDING ALERT SYSTEM AND METHOD

CROSS-REFERENCE TO RELATED APPLICATION(S)

This application in a Continuation Application of U.S. patent application Ser. No. 16/014,017 titled "Improved Taxiway Landing Alert System and Method" that was filed on Jun. 21, 2018, which claims priority from U.S. Provisional Patent Application No. 62/661,156, titled "Improved Taxiway Landing Alert System and Method" that was filed Apr. 23, 2018.

TECHNICAL FIELD

The present invention generally relates to aircraft operations, and more particularly relates to an improved runway landing alert system and method.

BACKGROUND

A runway landing alert system provides awareness for an aircrew when their aircraft is not lined up with a runway during an approach at low altitudes. A typical runway landing alert system will generate an alert based on certain preset conditions such as aircraft altitude, distance from the runway, and alignment with the runway. It is advantageous for runway landing alert system to provide early alerts when possible in order to improve safety margins for an aircraft approach. The system should be compatible with all approach procedures while also maintaining a low nuisance alert rate. Hence, there is a need for an improved runway landing alert system.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for generating a runway landing alert for an aircraft. The method comprises: establishing a Runway Awareness Advisory System (RAAS) envelope for a designated target runway of the aircraft; determining if the aircraft is still maneuvering into alignment with the designated target runway by monitoring the rate of change to a track of the aircraft, where an altitude parameter of the RAAS envelope is decreased if the aircraft is still maneuvering; and generating an alert for aircraft if the aircraft is outside of the RAAS envelope.

A system is provided for generating a runway landing alert for an aircraft. The system comprises: a flight management system (FMS) located on board the aircraft, where the FMS contains a flight plan for the aircraft; and a ground based station that receives the flight plan from the FMS via a data communication link, where the ground based station has a processor configured to: determine a designated target runway from the flight plan, establish a Runway Awareness Advisory System (RAAS) envelope for the designated target runway of the aircraft, determine if the aircraft is still maneuvering into alignment with the designated target runway by monitoring the rate of change to the track of the aircraft, where an altitude parameter of the RAAS envelope is decreased if the aircraft is still maneuvering, and generate an alert for aircraft if the aircraft is outside of the RAAS envelope.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

An improved runway landing alert system and method has been developed. The system provides awareness for an aircrew when an in-flight aircraft is not lined up with a runway during an approach at low altitudes. Embodiments of the runway alert system are part of a Runway Awareness Advisory System (RAAS). The RAAS is an electronic detection system that notifies aircraft flight crews of their position relative to their designated target runway. The RAAS uses an "envelope" as a reference to analyze an aircraft's approach to a runway. The envelope is a three-dimensional rectangular shaped box that extends from the end of the designated runway. A typical RAAS envelope may have the dimensions of a length of 3 nautical miles (NM) extending from the end of the designated runway, a width that is twice the width of the designated target runway and an altitude of 250 feet above the designated runway. The functionality of the system is typically hosted in an Enhanced Ground Proximity Warning System (EGPWS).

Figure 1:
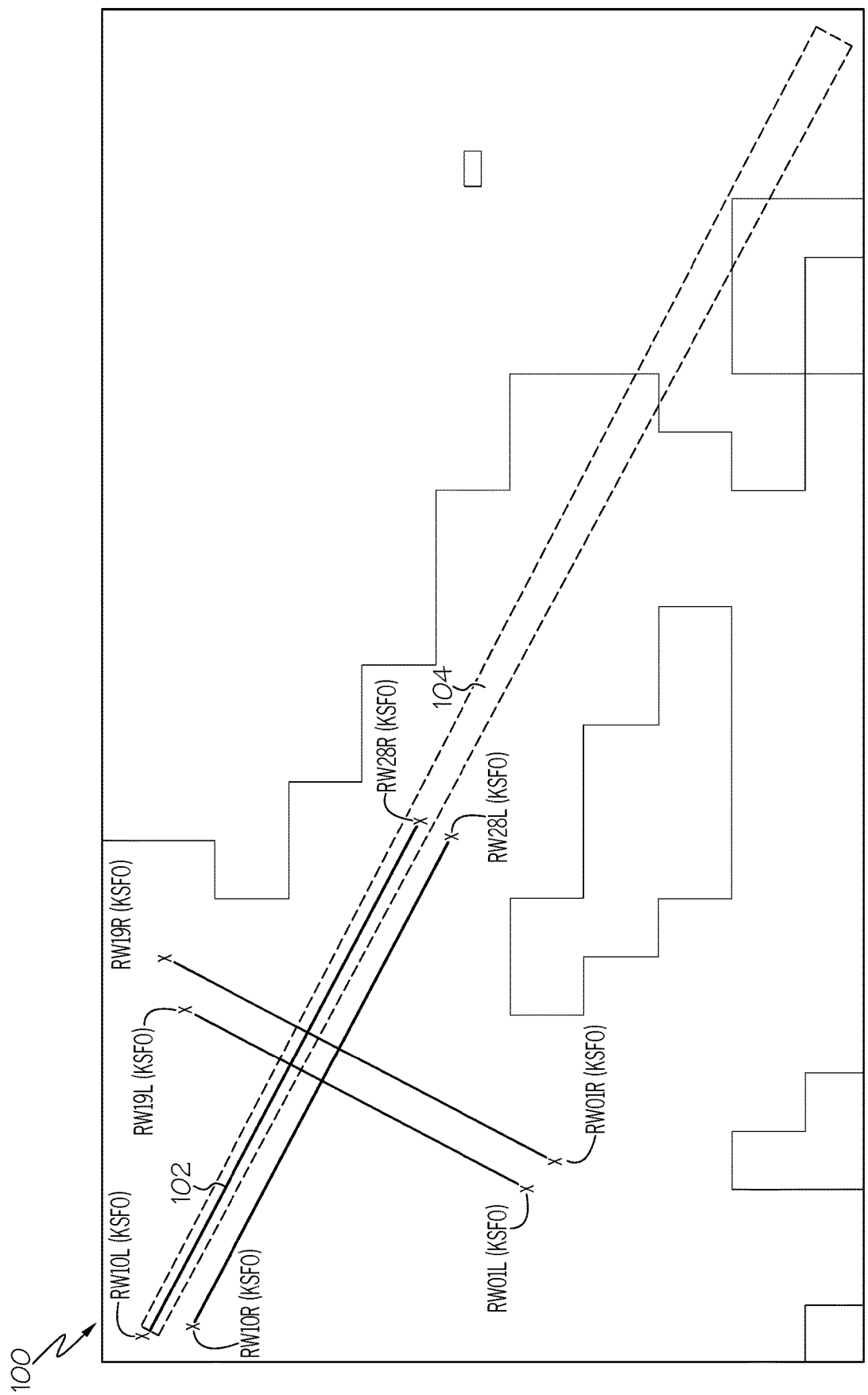
FIG. 1 shows a diagram of a Runway Awareness Advisory System (RAAS) envelope in accordance with one embodiment.

Turning now to FIG. 1, a diagram 100 is shown of an RAAS envelope 104 in accordance with one embodiment. In this example, the envelope 104 extends outward from the target runway 102 at a slight angle for distance of several NM that increases the width of the envelope at its distal end. The envelope is used to provide a positional reference for an aircraft on approach to the designated runway. While this existing embodiment provides appropriate and timely alerts for most operational conditions, there may be some limitations. For example, many approaches may provide spurious alerts to the aircrew based on conditions that do not merit a valid alert. In other examples, it is desirable to increase the altitude at which an alert is generated in order to increase safety margins for the aircraft so that it may more effectively perform maneuvers such as a "go-around" which is the recommended response to a runway landing alert.

Various embodiments of the runway landing alert system may allow alerts at higher altitudes if the aircraft is not aligned with the runway but is determined to be flying parallel to the runway centerline. For example, the alert altitude parameter may be increased to 350 feet from a default altitude of 250 feet when the aircraft is not aligned with the runway but it is determined to be flying parallel to the centerline. The aircraft is considered parallel if the selected runway is a likely runway and the deviation between the aircraft track and the runway heading is small (e.g., less than 5°). A "likely" runway is a selected runway that is determined with relative high probability to be the destination runway. Such an example of flying parallel to the centerline of the designated runway may be considered within an acceptable "margin of error" for the approach of the aircraft. If no likely runway is found or the track deviation is large, then the alert altitude remains at a lower value of 250 feet. This adjustment of increasing the altitude parameter allows earlier alerts so the aircraft may perform proper procedures (e.g., properly align approach to target runway) earlier.

Figure 2:
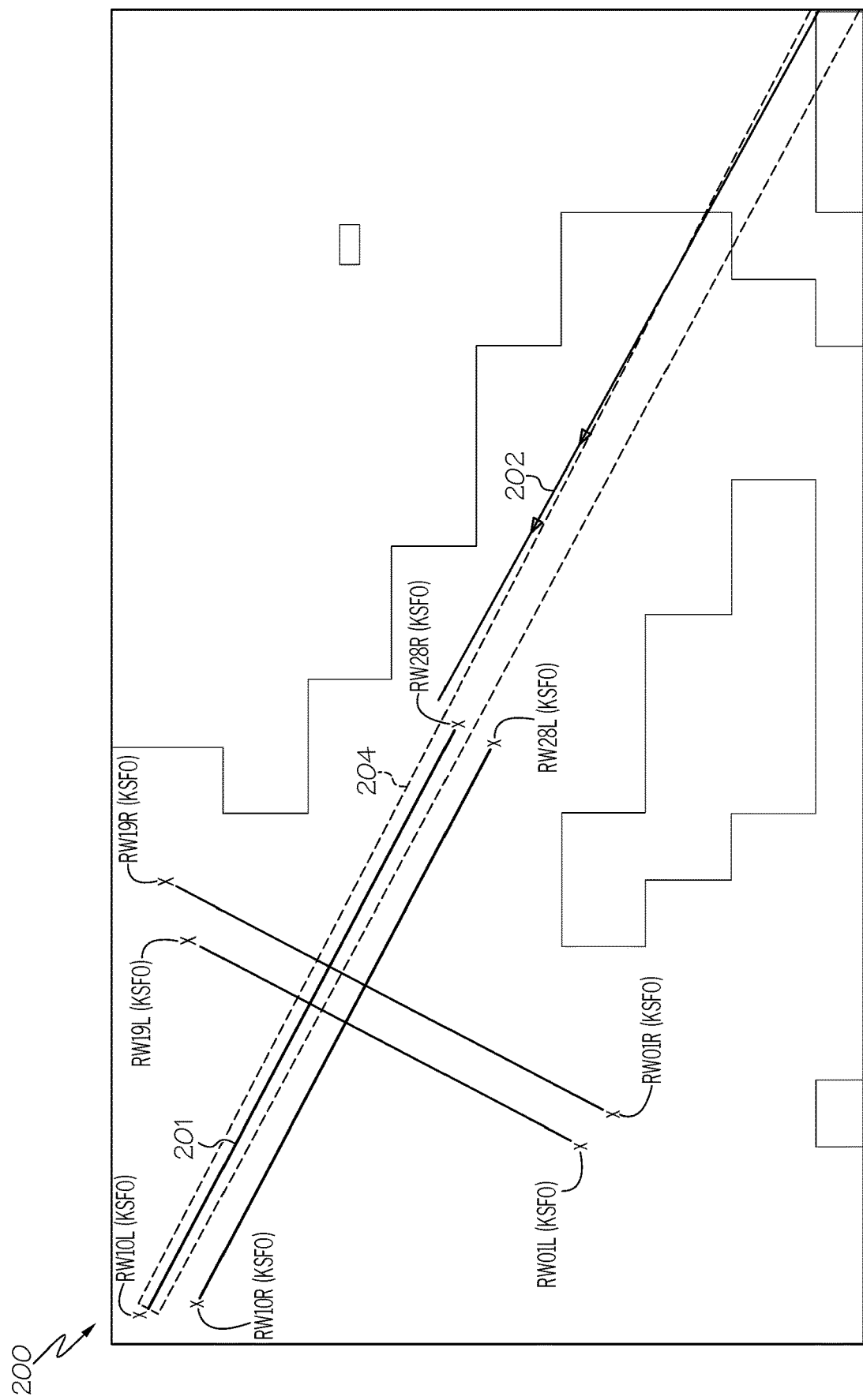
FIG. 2 shows a diagram of a small deviation in runway alignment requiring an alert for an aircraft in accordance with one embodiment.

Turning now to FIG. 2, a diagram 200 is shown of an example of a small deviation in runway alignment requiring an alert for an aircraft in accordance with one embodiment. As shown in this example, the RAAS envelope 204 has a small angle as the envelope extends away from the designated runway 201. This results in a decreasing width of the RAAS envelope 204 at the end of the runway. The track 202 of the aircraft is monitored with reference to the centerline of the target runway 201. The track 202 of the aircraft is calculated and monitored based on the position, heading, bearing and descent rate of the aircraft. In this example, the track 202 shows the aircraft flying parallel to the target runway 201. While the aircraft is initially within the envelope 204, the decreasing width will lead the aircraft 202 out of the envelope 204 prior to reaching the runway 201. The small deviation from the centerline of the target runway is within the margin of error. However, the aircraft may exit the envelope 204 too late to make an adequate correction to the aircraft track. Consequently, the runway deviation results in the alert altitude being increased to 350 feet which results in an earlier alert to the aircrew of the aircraft. Thus, the aircrew will have additional time to perform the approved procedure.

Figure 3:
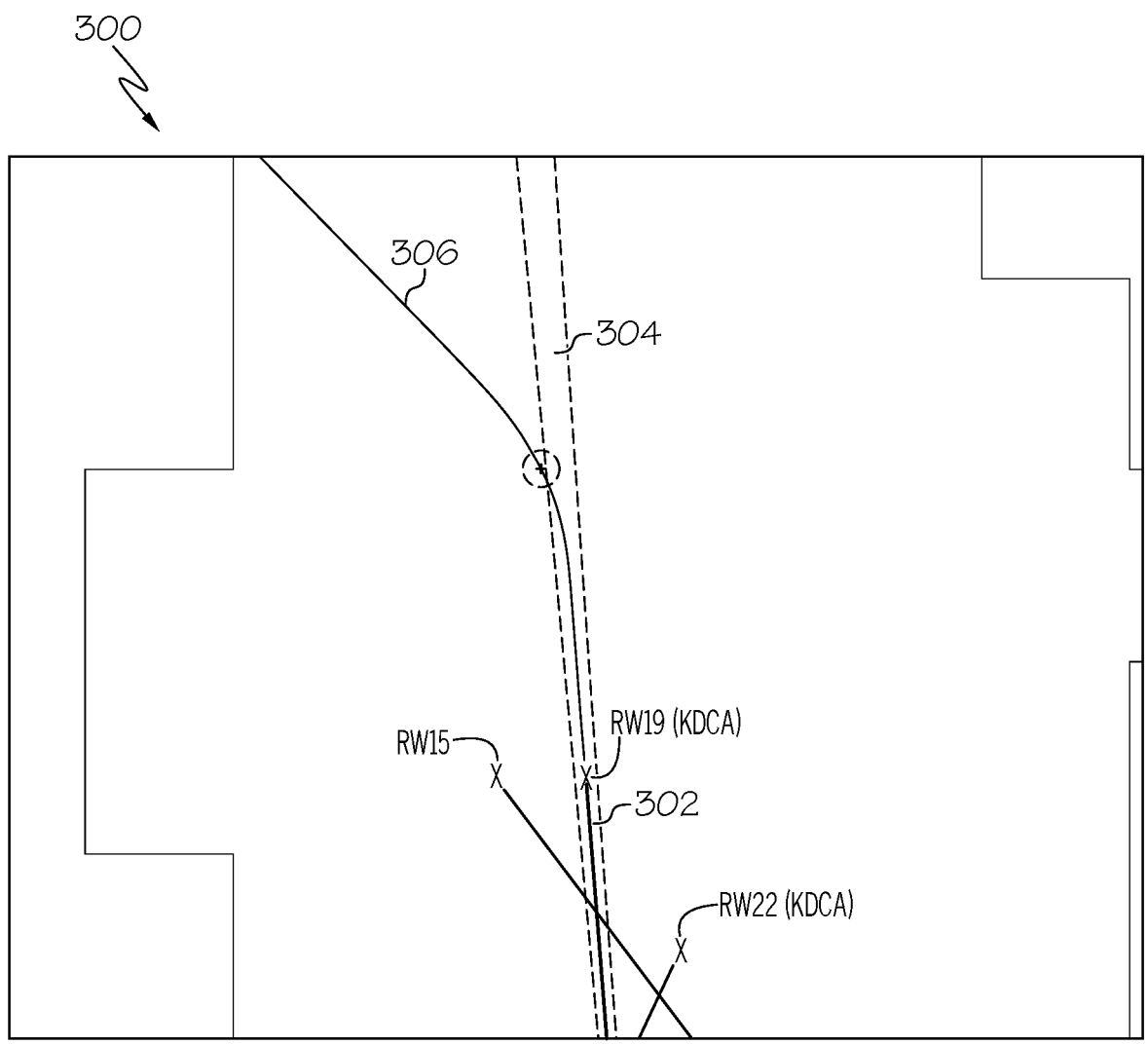
FIG. 3 shows a diagram of a late runway alignment that may result in a spurious alert for an aircraft in accordance with one embodiment.

In another example, FIG. 3 shows a diagram 300 of a late runway alignment requiring for an aircraft in accordance with one embodiment. In this example, the target runway 302 is identified but the aircraft track 306 has a deviation from the RAAS envelope 304 that is significant (e.g., greater than 20 degrees) and outside an acceptable margin of error. As a result, the aircraft's track check fails and the default lower alert altitude of 250 feet for the RAAS envelope is maintained. This is example of where the aircraft aligns late with the runway but the system identifies the situation and correctly does not generate a spurious alert.

Figure 4:
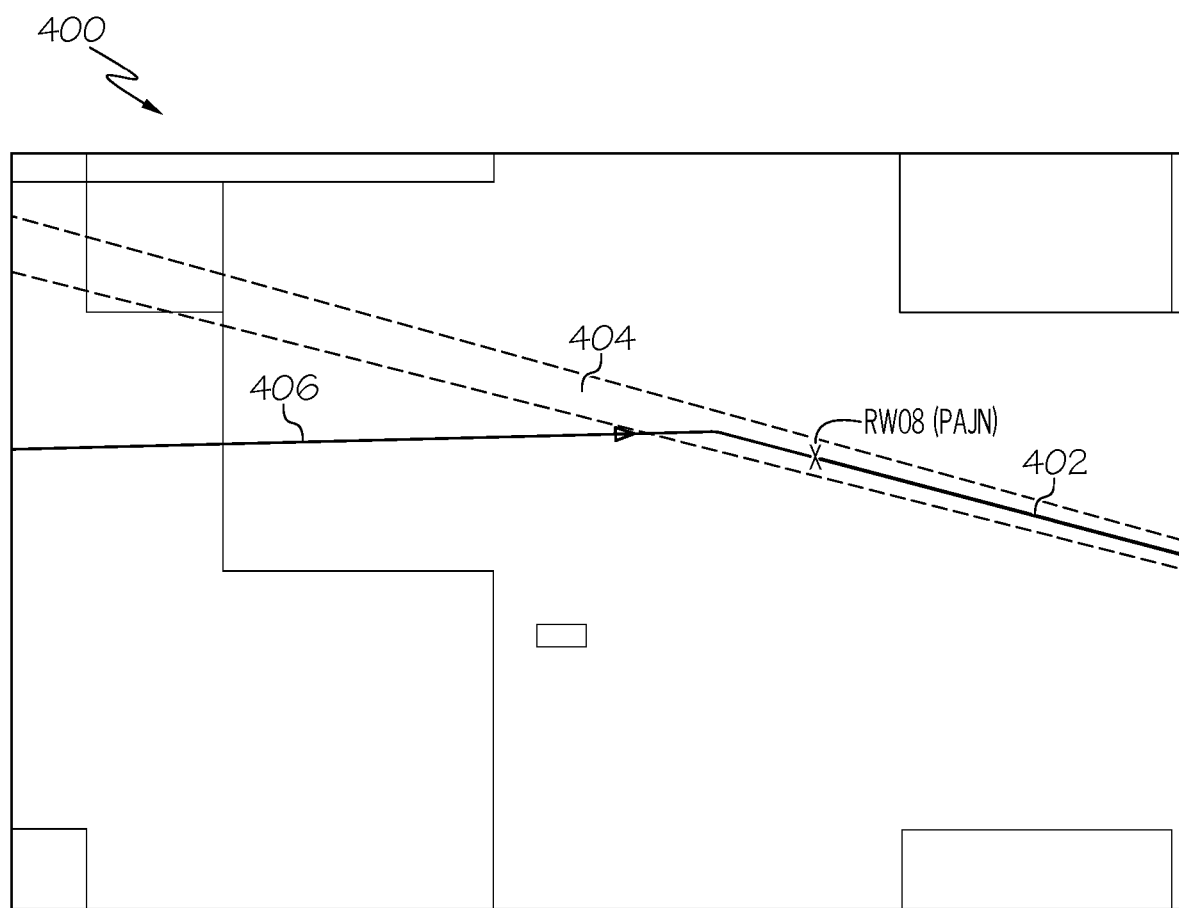
FIG. 4 shows a diagram of a potential late runway alignment that may result in a spurious alert for an aircraft in accordance with one embodiment.

In another example, FIG. 4 shows a diagram 400 of a potential late runway alignment that may result in a spurious alert for an aircraft. In this example, the aircraft track 406 shows that the aircraft is still maneuvering with respect to the centerline of the target runway 402. As the aircraft approaches the RAAS envelope 404, it maneuvers into alignment with the target runway 402. The aircraft is determined to still be maneuvering by monitoring the rate of change to the track of the aircraft. In other embodiments, the aircraft may be determined to still be maneuvering by monitoring the role angle of the aircraft. In still other embodiments, the runway database may contain information about the specific target runway allowing for a decreased alert altitude parameter. If the aircraft is still maneuvering or specific runway database information dictates, the altitude parameter for the envelope is decreased to 150 feet from 250 feet which prevents a spurious alert to the aircrew of the aircraft.

Figure 5:
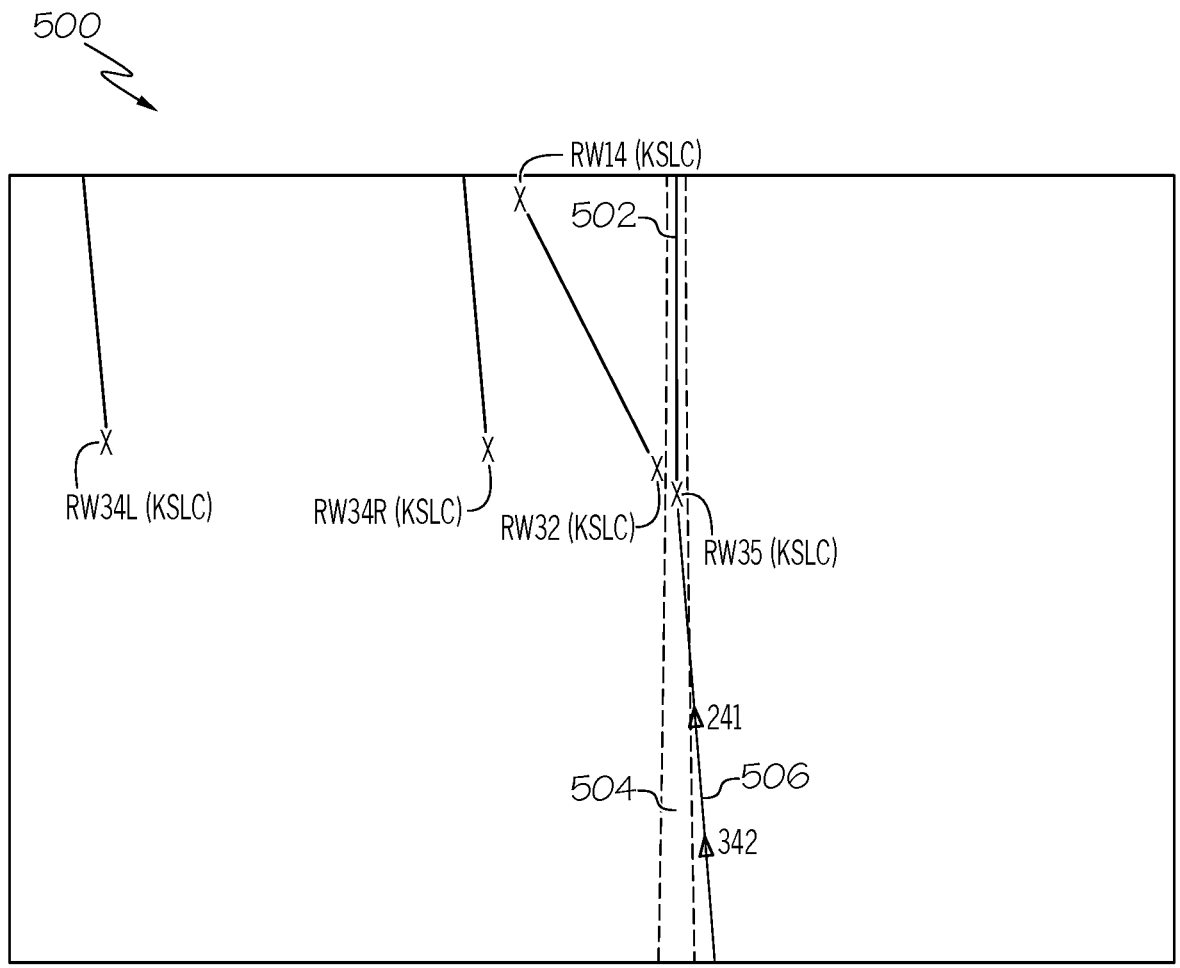
FIG. 5 shows a diagram of a small offset in runway alignment that may result in a spurious alert for an aircraft in accordance with one embodiment.

In another example, FIG. 5 shows a diagram 500 of a small offset in runway alignment that may result in a spurious alert for an aircraft in accordance with one embodiment. In this case, a potential spurious alert may occur due to a small offset (less than 5 degrees) of the track 506 aircraft while it moves within the RAAS envelope 504 towards the centerline of the target runway 502. As shown previously in FIG. 4, the aircraft is determined to still be maneuvering with respect to the target runway or there is information from the runway database dictating a lower alert altitude parameter. As a result, the altitude parameter setting is lowered to 150 ft. This prevents a spurious alert to the aircrew of the aircraft.

In some embodiments, the system may use height above field (HAF) to determine aircraft altitude instead of radio altitude readings. Radio altitude is determined by measurements with a radio altimeter. A radio altimeter uses radio signals to determine the altitude to the aircraft above the ground immediately below the aircraft. However, the radio altitude may be affected by localized terrain in direct proximity to the aircraft that does not reflect the true altitude of the runway. In contrast, HAF is computed based on a global positioning system (GPS) calibrated altitude of the aircraft and the runway end elevation. In other embodiments, HAF may be computed based on geometric altitude and the elevation of the end of the designated target runway. Both of these techniques provide a consistent alert altitude independent of terrain under the approach path. The use of radio altitude can result in spurious alerts if the terrain is higher than a runway and a late alert if the terrain is lower than the runway. In other embodiments, the altitude parameter may be adjusted for specific airports are runway by using appropriate data retrieved from the EGPWS runway database or other navigational database.

Figure 6:
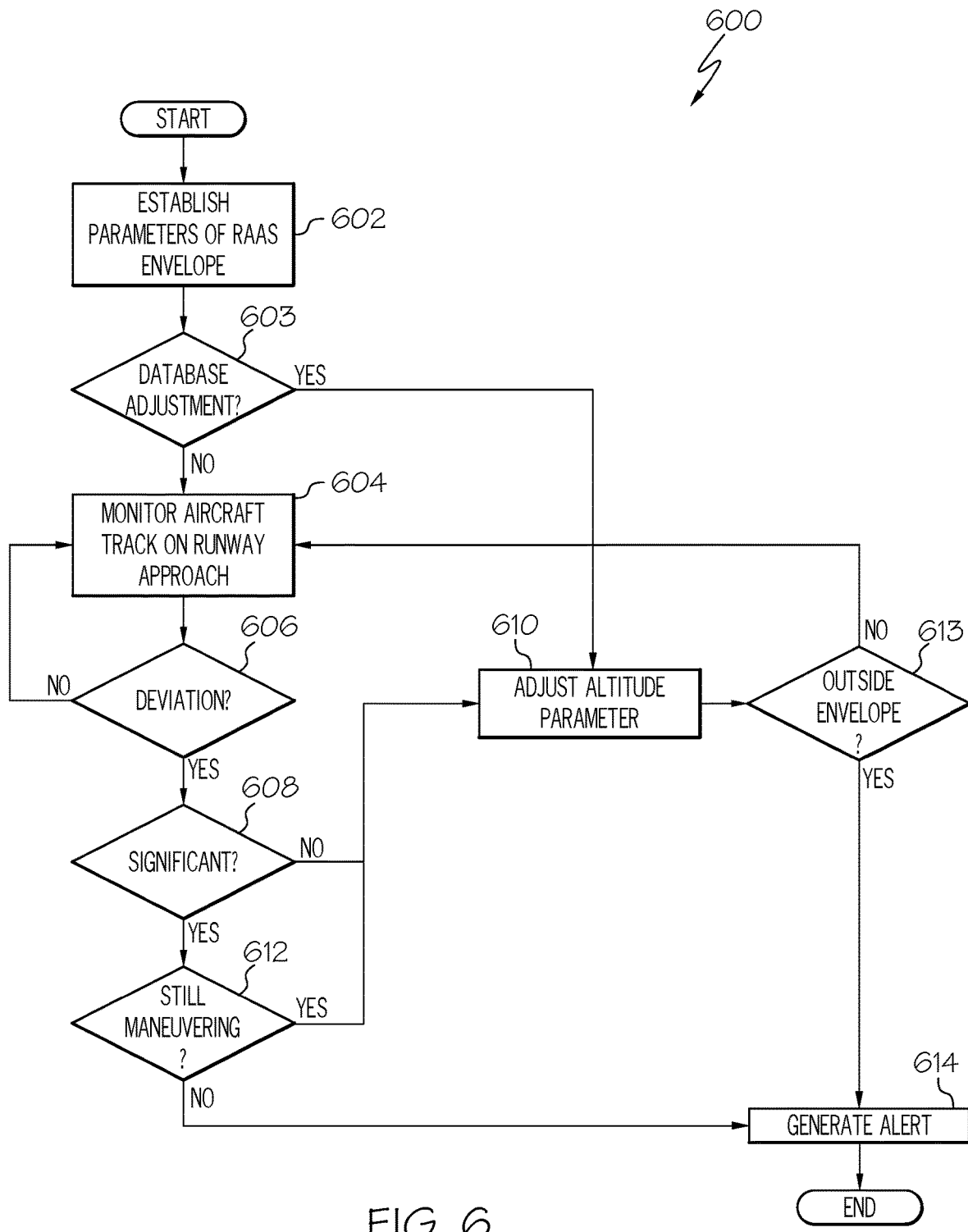
FIG. 6 shows a flow chart for a method of generating a runway alert for an aircraft in accordance with one embodiment.

Turning now to FIG. 6, a flow chart 600 is shown for a method of generating a runway alert for an aircraft in accordance with one embodiment. First, the parameters are established for a RAAS envelope of the target runway 602. The envelope may include a distance from the end of the runway, width of the envelope as well as an altitude alert range parameter. A navigational database is checked to determine 603 if the altitude parameter requires adjustment

610. The track of the aircraft on approach is monitored 604 for flight parameters such as position with respect to the centerline of the runway, heading, bearing, descent rate, etc. If a deviation from the centerline of the runway is detected 606, the angle of deviation is analyzed to determine its significance 608. If the angle of deviation is small and within a margin of error (i.e., not significant), the altitude parameter for the RAAS envelope is increased 610 to provide an earlier alert. However, if the angle of deviation is large (e.g., greater than 20°) and therefore significant, the aircraft is monitored to determine if it is still maneuvering 612. If the aircraft is determined to still be maneuvering, the altitude parameter for the RAAS envelope is decreased 610 to avoid a possible spurious alert. If the aircraft is outside the horizontal boundaries and below the altitude parameter of the adjusted RAAS envelope 613, a runway alignment alert is generated for the aircrew 614.

Figure 7:
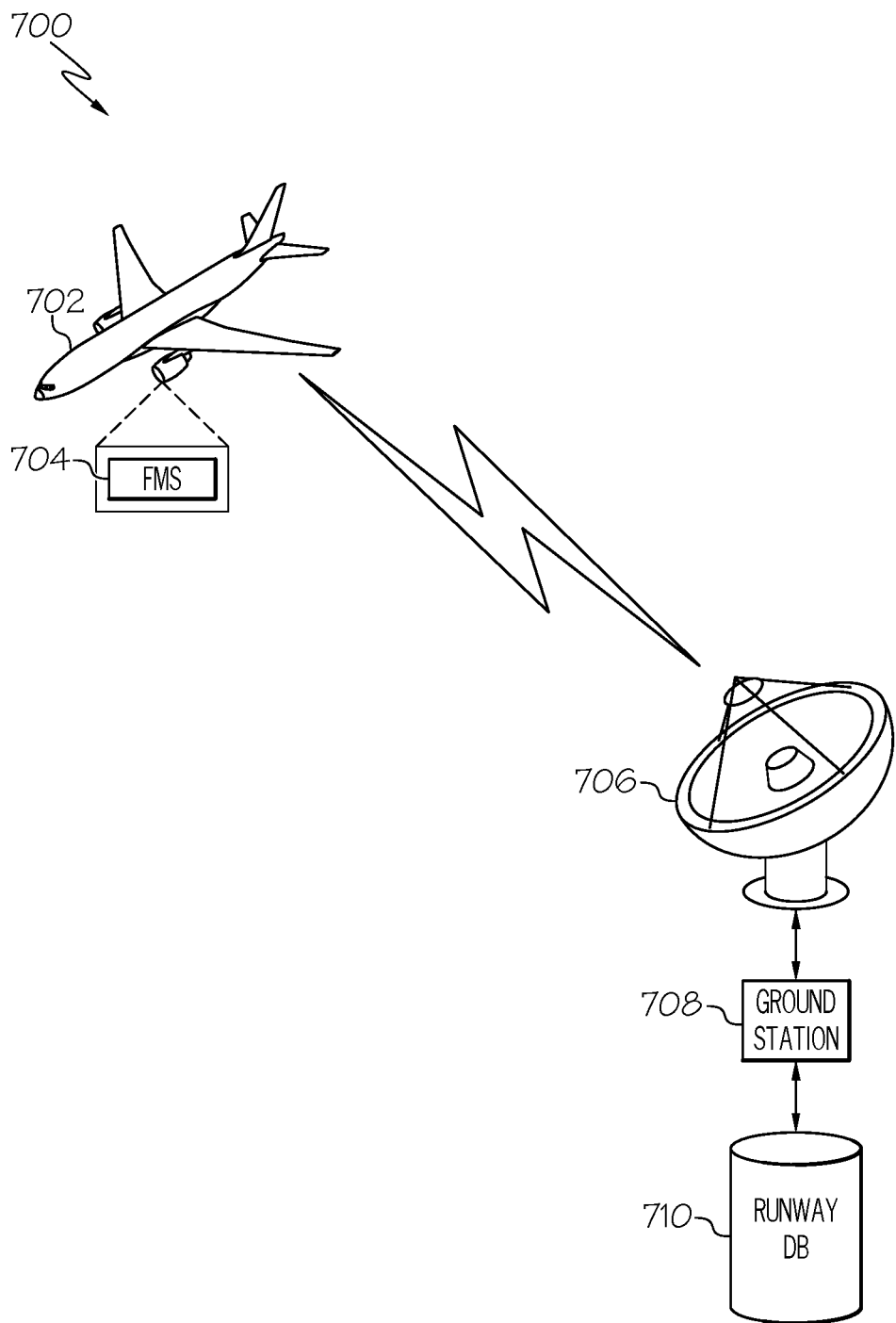
FIG. 7 shows a diagram of a system for generating a runway alert for an aircraft in accordance with one embodiment.

Turning now to FIG. 7, a diagram 700 is shown for a system of generating a runway alert for an aircraft in accordance with one embodiment. The system includes an in-flight aircraft 702 that has an onboard flight management system (FMS) 704. The FMS contains the flight plan for the aircraft including the designated target runway. A ground-based station 708 receives the designated target runway from the FMS 704 via a data communications link 706. The ground-based station has a processor that is configured to establish an RAAS envelope for the designated target runway, monitor the track of the aircraft and detect the any deviations by the aircraft from the centerline of the target runway. If a deviation by the aircraft is determined to be inside a margin of error, the altitude parameter of the envelope is increased to provide an early alert to the aircrew. Additionally, if the aircraft is determined to still be maneuvering with respect to the centerline of the target runway, the altitude parameter is decreased to avoid a spurious alert to the aircrew. In any other conditions where the aircraft is outside of the envelope, an alert is generated for the aircrew. In some embodiments, the ground station 708 has access to an EGPWS runway database 710 or other navigational database that provides data on the runway that may be a used to adjust the altitude parameter for an individual runway.

In summary, embodiments of the runway alert system include the ability to determine the likeliness that an aircraft is on approach to a designated runway as determined by the current position (vertical and lateral), track, heading, bearing and glide path of the aircraft. Use of this data is a good indication that the aircraft is on a path to land at or near the designated runway. The data may be used to activate or suppress the runway landing alert system as dictated by the track of the aircraft. For example, the rate of change of the aircraft track may indicate the aircraft is still maneuvering for alignment. In other embodiments, the role angle of the aircraft may be analyzed to determine if the aircraft is still maneuvering. If it is determined the aircraft is still maneuvering, this may be used as a condition to suppress the runway landing alert system by decreasing the altitude parameter when the aircraft is not yet aligned with the runway. This helps prevent generating spurious alerts to the aircrew.

Another embodiment of the runway alert system may include the ability to compute the aircraft track to determine if it is within a margin of error but still off track from the centerline of the target runway. If an aircraft meets these conditions, it may be used as a condition to enhance the runway landing alert system by increasing the altitude parameter in order to provide an early alert to the aircrew. The early alert will provide adequate time to make corrections to the aircraft track.

In other embodiments, the runway alert system may include using HAF as computed using GPS or geometric altitude and the elevation of the runway end. Use of HAF in place of radio altitude may help eliminate spurious or late alerts due to variations of the terrain in the vicinity of the aircraft approach path.

The runway alert system may include receiving a destination runway identification from the flight management system (FMS) on board the aircraft. The identified runway may be used as a preferred source of determining the destination of the aircraft that will allow the runway alignment determination to be more consistently analyzed. The alert system may retrieve additional data from the EGPWS runway database or other navigational database to allow tailoring for specific runways. This data would be used to adjust the altitude parameters for specific runways that have approach procedures that are not compatible with standard alert altitudes. The system may also adjust the distance from the runway that is used to enable the alert system. This allows the system to be consistent with the existing approach envelope distance and alert activation height. Reducing the activation distance may prevent spurious alerts when further from the runway or if another proximate runway is the actual destination of the aircraft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for generating a runway landing alert for an aircraft, comprising:
   establishing a Runway Awareness Advisory System (RAAS) envelope for a designated target runway of the aircraft;
   determining if the aircraft is still maneuvering into alignment with the designated target runway by monitoring a roll angle and a rate of change to a track of the aircraft, where an altitude parameter of the RAAS envelope is decreased if the aircraft is still maneuvering;
   generating an alert for aircraft if the aircraft is outside of the RAAS envelope; and
   adjusting the altitude parameter of the aircraft for the designated target runway in response to the alert for the aircraft.

2. The method of claim 1, where the RAAS envelope is established using information from a navigational runway database.

3. The method of claim 1, where the RAAS envelope has dimensions comprising:
   a length of 3 nautical miles (NM) from the end of the designated target runway;
   a width of twice the width of the designated target runway; and
   a height of 250 feet above the designated target runway.

4. The method of claim 1, where the track of the aircraft is monitored based on the position, heading, bearing and descent rate of the aircraft.

5. The method of claim 1, where the altitude parameter of the RAAS envelope is increased to 350 feet above the designated target runway.

6. The method of claim 1, where the altitude parameter is measured as a height above airfield (HAF).

7. The method of claim 6, where the HAF is computed using a global positioning system (GPS) and the elevation of the end of the designated target runway.

8. The method of claim 6, where the HAF is computed using a geometric altitude and the elevation of the end of the designated target runway.

9. The method of claim 1, where the altitude parameter is adjusted for specific designated target runway based on data in an enhanced ground proximity warning system (EGPWS) runway database.

10. The method of claim 1, where the aircraft is determined to still be maneuvering by monitoring a roll angle of the aircraft.

11. A system for generating a runway landing alert for an aircraft, comprising:
    a flight management system (FMS) located on board the aircraft, where the FMS contains a flight plan for the aircraft; and
    a ground based station that receives the flight plan from the FMS via a data communication link, where the ground based station has a processor configured to:
       determine a designated target runway from the flight plan,
       establish a Runway Awareness Advisory System (RAAS) envelope for the designated target runway of the aircraft,
       determine if the aircraft is still maneuvering into alignment with the designated target runway by monitoring a roll angle and a rate of change to the track of the aircraft, where an altitude parameter of the RAAS envelope is decreased if the aircraft is still maneuvering,
       generate an alert for aircraft if the aircraft is outside of the RAAS envelope, and
       adjust the altitude parameter of the aircraft for the designated target runway in response to the alert for the aircraft.

12. The system of claim 11, further comprising:
    an enhanced ground proximity warning system (EGPWS) runway database that provides data to the ground based station for adjusting the altitude parameter.

13. The system of claim 11, where the altitude parameter is measured as a height above airfield (HAF).

14. The system of claim 13, where the HAF is computed using a global positioning system (GPS) and the elevation of the end of the designated target runway.

15. The system of claim 13, where the HAF is computed using a geometric altitude and the elevation of the end of the designated target runway.

* * * * *